(No Model.)

C. & S. K. COONS.
DISH DRAINER.

No. 423,740. Patented Mar. 18, 1890.

Witnesses

Inventor
C. & S. K. Coons.
By their Attorney

UNITED STATES PATENT OFFICE.

CHARLES COONS AND SAMUEL K. COONS, OF BINGHAMTON, NEW YORK.

DISH-DRAINER.

SPECIFICATION forming part of Letters Patent No. 423,740, dated March 18, 1890.

Application filed December 26, 1889. Serial No. 334,964. (No model.)

*To all whom it may concern:*

Be it known that we, CHARLES COONS and SAMUEL K. COONS, of Binghamton, in the county of Broome and State of New York, have invented certain new and useful Improvements in Dish-Drainers; and we do hereby declare that the following is a full, clear, and exact description thereof, reference being had to the accompanying drawings, and to the letters of reference marked thereon, which form part of this specification, in which—

Figure 1:
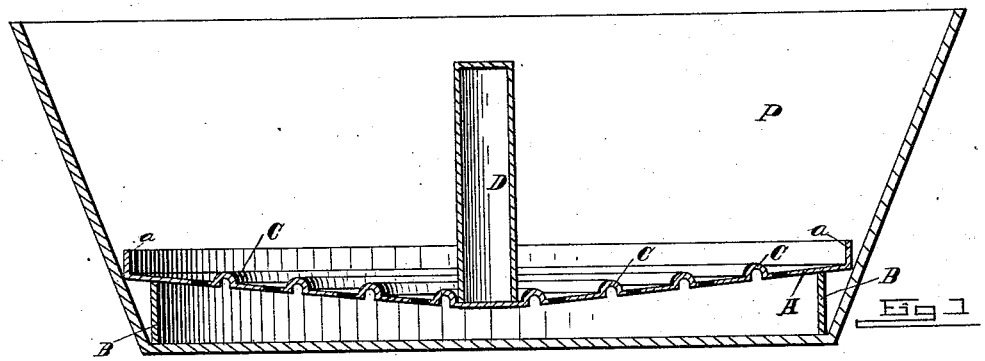
Figure 2:
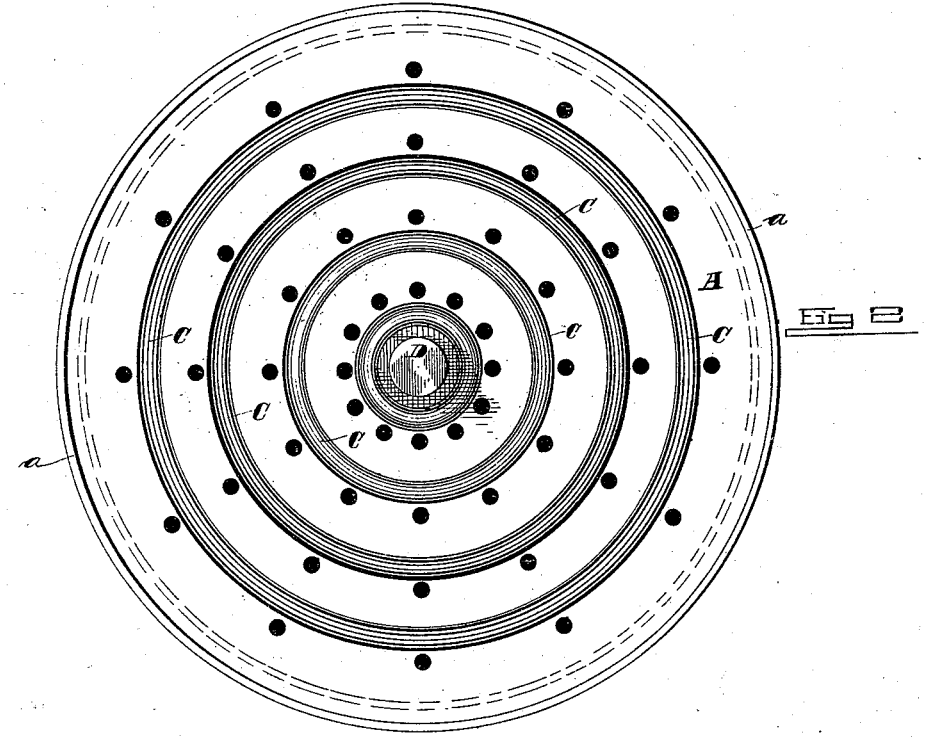
Figure 3:
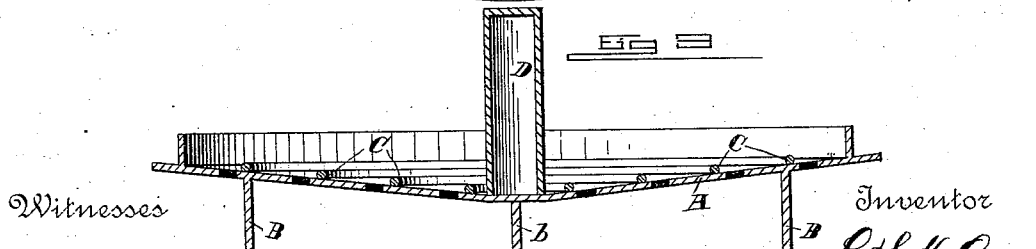

Figure 1 is a central vertical section through our improved dish-drainer as placed in a pan. Fig. 2 is a plan view of the same. Fig. 3 is a sectional view of a modified form thereof.

This invention is an improved device for use in cleaning or washing dishes and other pieces of table-service; and it consists, essentially, in a perforated disk which can be placed in an ordinary pan, and upon which the plates can be set, the disks being provided or formed so that the articles placed thereon can be set edgewise, and hot water poured on the articles will pass through the perforations or openings of the disk into the pan, leaving the dishes, &c., comparatively dry, all of which will be understood from the following description and claims.

Referring to the drawings by letters, A designates a disk formed of wire-cloth or sheet metal, and perforated, as shown, it being desirable to allow water to pass freely through the disk. The rim or edge of the disk is upturned, as at *a a*, or has a band secured thereto, as shown in Fig. 3, to prevent any articles—such as dishes—slipping therefrom; and the disk is supported upon a base-band B or feet, if desired, so that when the disk is placed in a pan P, as shown, water can collect thereunder. The disk has a series of beads C on its upper surface, preferably formed by ridging the disk proper, although they may be formed by pieces or wires secured thereto, as in Fig. 3. These beads are arranged concentrically, or one within the other, and correspond in contour to the edge of the disk.

D designates a rest or support rising centrally from the disk, and against which the plates and dishes can be leaned, so as to support them in about a vertical position, the beads C or rim *a* preventing the lower edges of the dishes slipping outwardly, while the disk might also have a central supporting-leg *b* on its under surface, as shown. The disk may be flat. It is preferably made slightly conical, as shown, its center being lower than its periphery, so that the water from the dishes will more readily drain off and through the disk, the openings in which, when it is made of sheet metal, being arranged near the beads and rim to facilitate the escape of water.

In using the drainer it is placed in a pan, as indicated in the drawings, and the plates or dishes, &c., are set thereon. Then hot water can be poured over the latter, which will cleanse the same, and the water escaping through the disk into the bottom of the pan leaves the plates, &c., nearly dry and clean, so that but little wiping thereof is necessary, and the device can be used to support dishes already washed but not wiped, so as to let the water drain therefrom.

The drainers can be made of varying sizes, to be kept in stock to use with different-sized pans.

Having described our invention, what we claim as new, and desire to secure by Letters Patent thereon, is—

1. The combination, with a pan, of the dish-draining device consisting of a disk having an upstanding portion at its periphery, a central upstanding support, and a series of concentric beads and the supports for the disk, substantially as specified.

2. The herein-described dish-draining device, consisting of a perforated disk mounted on supports and having its edge upturned, a central upstanding support for the dishes to lean against, and concentric beads between the support and edge of the disk, all substantially as and for the purpose specified.

In testimony that we claim the foregoing as our own we affix our signatures in presence of two witnesses.

CHARLES COONS.
SAMUEL K. COONS.

Witnesses:
GEO. W. OSTRANDER,
C. F. GALE.